(12) United States Patent
Zhang (10) Patent No.: US 11,422,424 B2
(45) Date of Patent: Aug. 23, 2022

(54) ARRAY SUBSTRATE AND DISPLAY PANEL (71) Applicant: SHENZHEN CHINA STAR OPTOELECTRONICS SEMICONDUCTOR DISPLAY TECHNOLOGY CO., LTD., Guangdong (CN)

(72) Inventor: Yinfeng Zhang, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 208 days.

(21) Appl. No.: 16/764,725

(22) PCT Filed: Apr. 7, 2020

(86) PCT No.: PCT/CN2020/083536
§ 371 (c)(1),
(2) Date: May 15, 2020

(87) PCT Pub. No.: WO2021/179381
PCT Pub. Date: Sep. 16, 2021

(65) Prior Publication Data
US 2022/0113573 A1 Apr. 14, 2022

(30) Foreign Application Priority Data

Mar. 12, 2020 (CN) .......................... 202010170586.1

(51) Int. Cl.
*G02F 1/1343* (2006.01)
*G02F 1/1368* (2006.01)

(52) U.S. Cl.
CPC ...... *G02F 1/1368* (2013.01); *G02F 1/134345* (2021.01)

(58) Field of Classification Search
CPC ............. G02F 1/1343; G02F 1/134309; G02F 1/134345; G02F 1/1368
See application file for complete search history.

(56) References Cited

U.S. PATENT DOCUMENTS

2014/0043568 A1 2/2014 Yeh et al.
2014/0264330 A1 9/2014 Iyama et al.
(Continued)

FOREIGN PATENT DOCUMENTS

CN 101349852 A 1/2009
CN 102231017 A 11/2011
(Continued)

*Primary Examiner* — Thoi V Duong (57) ABSTRACT

An array substrate and a display panel are provided. In the array substrate, sub-pixels include a main pixel area, a transistor connection area, and an auxiliary pixel area arranged along a first direction. Branch portions of pixel electrodes of the sub-pixels in the main pixel area and the auxiliary pixel area form included angles, and two adjacent included angles along a second direction face opposite directions. Every two rows of the sub-pixels form a balance unit, wherein a number of the included angles of first sub-pixels located in even positions of an odd-numbered row and in odd positions of an even-numbered row facing the second direction is equal to that of the included angles of the first sub-pixels located in the even positions of the odd-numbered row and in the odd positions of the even-numbered row facing a third direction.

6 Claims, 6 Drawing Sheets

(56) References Cited

U.S. PATENT DOCUMENTS

| | | |
|---|---|---|
| 2015/0241719 A1 | 8/2015 | Yeh et al. |
| 2015/0253636 A1 | 9/2015 | Yeh et al. |
| 2016/0246108 A1 | 8/2016 | Hsu et al. |
| 2018/0364528 A1 | 12/2018 | Yeh et al. |
| 2020/0150496 A1 | 5/2020 | Woo et al. |
| 2020/0301179 A1 | 9/2020 | Im et al. |

FOREIGN PATENT DOCUMENTS

| | | | |
|---|---|---|---|
| CN | 102253532 | A | 11/2011 |
| CN | 104024933 | A | 9/2014 |
| CN | 104345500 | A | 2/2015 |
| CN | 104460077 | A | 3/2015 |
| CN | 105911776 | A | 8/2016 |
| CN | 107479287 | A | 12/2017 |
| CN | 109634012 | A | 4/2019 |
| CN | 110850645 | A | 2/2020 |
| TW | 201213988 | A | 4/2012 |

ARRAY SUBSTRATE AND DISPLAY PANEL

FIELD OF DISCLOSURE

The present application relates to the field of display technology, and particularly relates to an array substrate and a display panel.

BACKGROUND OF DISCLOSURE

Figure 1:
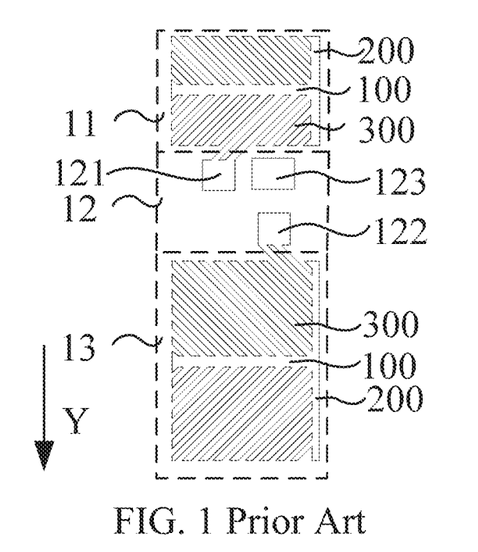
FIG. 1 is a schematic diagram of a pixel electrode structure having a four-domain structure in the sub-pixel of the prior art.
Figure 2:
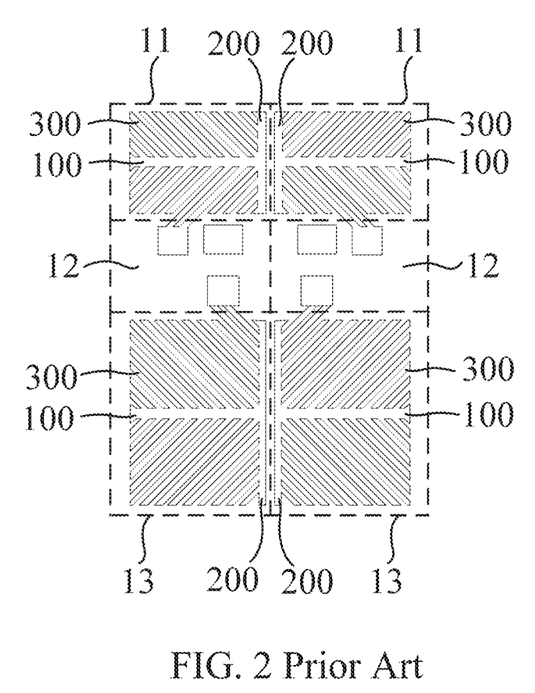
FIG. 2 is a schematic diagram of a "Union jack sign" type arrangement between sub-pixels in the prior art.
Figure 3:
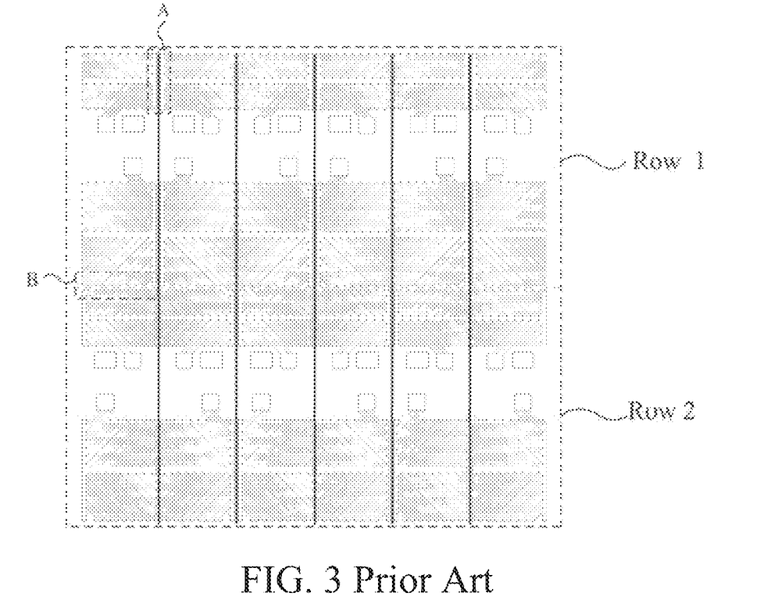
FIG. 3 is a schematic diagram of the arrangement of each sub-pixel on the array substrate in the prior art.

In the prior art, a pixel electrode of a sub-pixel is often reduced from an eight-domain structure to a four-domain structure, so as to reduce dark stripes at a center main portion and improve the transmittance. As shown in FIG. 1, it is a schematic diagram of a pixel electrode structure having a four-domain structure in the sub-pixel of the prior art. The sub-pixel comprises a main pixel area 11, a transistor connection area 12, and an auxiliary pixel area 13. In the main pixel area 11 and the auxiliary pixel area 13, the pixel electrode comprises a center main portion 100, an edge main portion 200, and branch portions 300, and the branch portions 300 on two sides of each center main portion 100 are connected to form an included angle. When the sub-pixels emit light, sine the dark stripes have the property of converging toward one side, it is necessary to ensure that an orientation of each of the included angles between the sub-pixels forms a "union jack sign" type arrangement as shown in FIG. 2, so as to effectively converge the dark stripes into an area, where the edge main portions 200 of adjacent sub-pixels are close to each other, to achieve a theoretical increase in transmittance. In FIG. 2, a vertex of the included angle of the pixel electrode of the left sub-pixel in the main pixel area 11 is to the right, and the edge main portion 200 is on the right; a vertex of the included angle of the pixel electrode of the right sub-pixel in the main pixel area 11 is to the left, and the edge main portion 200 is on the left. The center main portions 100, the edge main portions 200, and the branch portions 300 of the two in the main pixel area 11 form a "union jack sign" type arrangement, which converge the dark stripes to the edge main portions 200 of the two sub-pixels. In addition, in order to avoid the phenomenon of large viewing angle color shift when the entire screen is lit, the orientation of the included angles in the sub-pixels in adjacent rows of the sub-pixels in the same column should be opposite. Thus, the arrangement of each of the sub-pixels on the existing array substrate is shown as FIG. 3.

Figure 4:
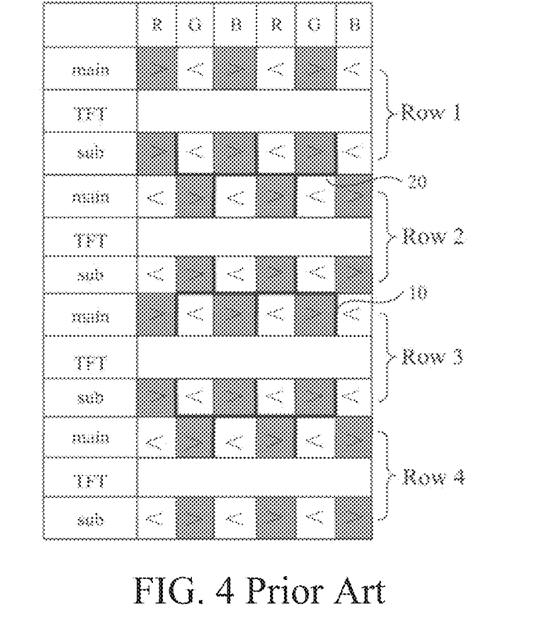
FIG. 4 is a schematic diagram of dark stripes generated during a special image test of the array substrate in the prior art.

On the one hand, the design can converge the dark stripes to a center of the "union jack sign" at a position A to improve the transmittance. However, since the main pixel area and the auxiliary pixel area of the sub-pixels in adjacent rows are relatively close and there is no edge main portion 200 at a position B, when the tilt directions of the branch portions of the auxiliary pixel area in the upper sub-pixels and the branch portions of the main pixel area in the lower sub-pixels are the same, the horizontal pull dark stripes will occur due to the misalignment of the branch portions of the two. The pull dark stripes are not inducive to the improvement of the transmittance. Take four rows of the sub-pixels as an example, the vertex of the included angle to the left is marked as "<", and to the right is marked as ">". At this time, converging dark stripes 10 and pull dark stripes 20 appear in the whole substrate as shown in FIG. 4. On the other hand, when the display panel adopts the sub-pixels with a four-domain structure, the problem of large viewing angle color shift deterioration will occur. The structure of FIG. 3 can be balanced by adjacent sub-pixels to improve the problem of large viewing angle color shift when the entire screen is lit, but when a special image test is performed as shown in FIG. 4, the sub-pixels in even positions of odd-numbered rows and in odd positions of even-numbered rows are lit, the orientations of the included angles in all lit sub-pixels will be the same. Thus, the shift of the left and right viewing angles will be relatively large. The effect of mutual balance of adjacent pixels cannot be achieved, and the color shift is serious. Accordingly, the existing design is difficult to meet the special image test performed by the high-end model for achieving the special image quality guarantee.

Therefore, the existing array substrate has the technical problem that it cannot meet the special image test and high transmittance at the same time, which needs to be improved.

SUMMARY OF DISCLOSURE

Technical Problems

An embodiment of the present application provides an array substrate, which is used to relieve the technical problem of the existing array substrate that it cannot meet the special image test and high transmittance at the same time.

Technical Solutions

To solve the above problems, the present application provides the technical solutions as follows.

The present application provides an array substrate comprising a plurality of sub-pixel arranged in an array. The sub-pixel comprises a main pixel area, a transistor connection area, and an auxiliary pixel area arranged along a first direction, and the sub-pixel is provided with a pixel electrode, wherein in each of the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion. The branch portions on two sides of each of the center main portions are connected to form an included angle, and two adjacent included angles along the second direction in the array substrate face opposite directions. From a first row, every two rows of the sub-pixels form a balance unit. In each of the balance units, the sub-pixels comprise first sub-pixels that are located in even positions of an odd-numbered row and in odd positions of an even-numbered row and second sub-pixels that are located in odd positions of the odd-numbered row and in even positions of the even-numbered row. A number of the included angles facing the second direction in the first sub-pixels is equal to that of the included angles facing a third direction in the first sub-pixels, and the second direction is opposite to the third direction.

According to an array substrate of the present application, the first direction is perpendicular to the second direction.

According to an array substrate of the present application, in the balance unit, the included angles of each of the first sub-pixels in the main pixel area and the included angles of each of the first sub-pixels in the auxiliary pixel area face the same direction.

According to an array substrate of the present application, in the balance unit, the included angles of each of the first sub-pixels in the main pixel area and the included angles of each of the first sub-pixels in the auxiliary pixel area face opposite directions.

According to an array substrate of the present application, in the balance unit, the included angles of all the first sub-pixels in the main pixel area face the same direction.

According to an array substrate of the present application, in the balance unit, the included angles of the first sub-pixels in different rows in the main pixel area face opposite directions.

According to an array substrate of the present application, the first direction is parallel to the second direction.

According to an array substrate of the present application, vertices of two adjacent included angles along the second direction both face a boundary line of the sub-pixels in adjacent rows.

According to an array substrate of the present application, the included angles of all the balance units in the array substrate are configured in the same way.

According to an array substrate of the present application, the included angles of the balance units in different positions in the array substrate are not completely configured in the same way.

The present application further provides a display panel comprising an array substrate, and the array substrate comprises a plurality of sub-pixels arranged in an array. The sub-pixel comprises a main pixel area, a transistor connection area, and an auxiliary pixel area arranged along a first direction, and the sub-pixel is provided with a pixel electrode, wherein in each of the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion. The branch portions on two sides of each of the center main portions are connected to form an included angle, and two adjacent included angles along the second direction in the array substrate face opposite directions. From a first row, every two rows of the sub-pixels form a balance unit. In each of the balance units, the sub-pixels comprise first sub-pixels that are located in even positions of an odd-numbered row and in odd positions of an even-numbered row and second sub-pixels that are located in odd positions of the odd-numbered row and in even positions of the even-numbered row. A number of the included angles facing the second direction in the first sub-pixels is equal to that of the included angles facing a third direction in the first sub-pixels, and the second direction is opposite to the third direction.

According to a display panel of the present application, the first direction is perpendicular to the second direction.

According to a display panel of the present application, in the balance unit, the included angles of each of the first sub-pixels in the main pixel area and the included angles of each of the first sub-pixels in the auxiliary pixel area face the same direction.

According to a display panel of the present application, in the balance unit, the included angles of each of the first sub-pixels in the main pixel area and the included angles of each of the first sub-pixels in the auxiliary pixel area face opposite directions.

According to a display panel of the present application, in the balance unit, the included angles of all the first sub-pixels in the main pixel area face the same direction.

According to a display panel of the present application, in the balance unit, the included angles of the first sub-pixels in different rows in the main pixel area face opposite directions.

According to a display panel of the present application, the first direction is parallel to the second direction.

According to a display panel of the present application, vertices of two adjacent included angles along the second direction both face a boundary line of the sub-pixels in adjacent rows.

According to a display panel of the present application, the included angles of all the balance units in the array substrate are configured in the same way.

According to a display panel of the present application, the included angles of the balance units in different positions in the array substrate are not completely configured in the same way.

Beneficial Effects

The beneficial effects of the present application is that, the present application provides an array substrate and a display panel. The array substrate comprises a plurality of sub-pixels arranged in an array. The sub-pixel comprises a main pixel area, a transistor connection area, and an auxiliary pixel area arranged along a first direction, and the sub-pixel is provided with a pixel electrode, wherein in each of the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion. The branch portions on two sides of each of the center main portions are connected to form an included angle, and two adjacent included angles along the second direction in the array substrate face opposite directions. From a first row, every two rows of the sub-pixels form a balance unit. In each of the balance units, the sub-pixels comprise first sub-pixels that are located in even positions of an odd-numbered row and in odd positions of an even-numbered row. A number of the included angles facing the second direction in the first sub-pixels is equal to that of the included angles facing a third direction in the first sub-pixels, and the second direction is opposite to the third direction. In the present application, every two rows of the sub-pixels are used as a balance unit, and the numbers of the included angles facing opposite directions in the first sub-pixels of the balance unit are configured to be the same. When only the first sub-pixels are lit or only the second sub-pixels are lit, the included angles facing opposite directions in each of the balance units can be balanced with each other, which improves the color shift problem during the special image test. Also, the design reduces the situation that the tilt directions of the branch portions are the same when the branch portions of adjacent sub-pixels are close to each other directly, thereby reducing the number of the dark stripes and improving the transmittance. Therefore, the special image adaptation and the transmittance improvement are achieved.

DESCRIPTION OF DRAWINGS

To describe the technical solutions in the embodiments of the present application or in the prior art more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF PREFERRED EMBODIMENTS

The foregoing objects, features and advantages adopted by the present application can be best understood by referring to the following detailed description of the preferred embodiments and the accompanying drawings. Furthermore, the directional terms described in the present application, such as upper, lower, front, rear, left, right, inner, outer, side and etc., are only directions referring to the accompanying drawings, so that the used directional terms are used to describe and understand the present application, but the present application is not limited thereto. In the drawings, similar structural units are designated by the same reference numerals.

An embodiment of the present application provides an array substrate and a display panel used to relieve the technical problem that the existing array substrate cannot meet the special image test and high transmittance at the same time.

The present application provides an array substrate comprising a plurality of sub-pixel arranged in an array. The sub-pixel comprises a main pixel area, a transistor connection area, and an auxiliary pixel area arranged along a first direction, and the sub-pixel is provided with a pixel electrode. In the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion. The branch portions on two sides of each of the center main portions are connected to form an included angle, and two adjacent included angles along the second direction in the array substrate face opposite directions. From a first row, every two rows of the sub-pixels form a balance unit. In each of the balance units, the sub-pixels comprise first sub-pixels that are located in even positions of an odd-numbered row and in odd positions of an even-numbered row and second sub-pixels that are located in odd positions of the odd-numbered row and in even positions of the even-numbered row. In the first sub-pixels, a number of the included angles facing the second direction is equal to that of the included angles facing a third direction, and the second direction is opposite to the third direction.

The structure of the sub-pixel in the present embodiment is the same as the structure of the sub-pixel in the prior art, which can be referred to FIG. 1. The sub-pixel comprises a main pixel area 11, a transistor connection area 12, and an auxiliary pixel area 13 arranged along a first direction Y, and the sub-pixel is provided with a pixel electrode. In the main pixel area 11 and the auxiliary pixel area 13, the pixel electrode comprises a center main portion 100 parallel to a second direction, an edge main portion 200 perpendicularly connected to the center main portion 100, and branch portions 300 distributed on two sides of the center main portion 100 and connected to the center main portion 100 and the edge main portion 200. The branch portions 300 on two sides of each of the center main portions 100 are connected to form an included angle.

In the main pixel area 11 and the auxiliary pixel area 13, the center main portion 100, the edge main portion 200, and the branch portions 300 of the pixel electrode are opaque. The branch portions 300 on two sides of the center main portion 100 are both multiple inclined strip structures, and an area between the strip structures is a light-transmitting area. In the transistor connection area 12, the pixel electrode is respectively connected to drains of two transistors by a first connection end 121 and a second connection end 122, and a third connection end 123 forms a polar plate for storing capacitance.

Figure 5:
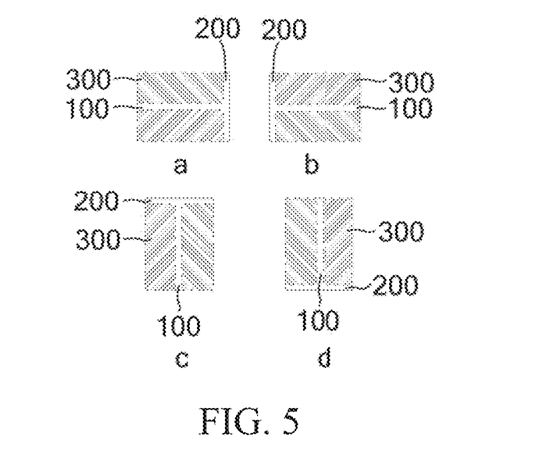
FIG. 5 is a schematic diagram of the orientation of each included angle in the array substrate provided by an embodiment of the present application.

FIG. 5 shows four orientations of the branch portions 300. For convenience of description, each orientation is represented by a symbol, wherein a vertex of an included angle in a of FIG. 5 faces to the right, represented by ">"; a vertex of an included angle in b of FIG. 5 faces to the right, represented by "<"; a vertex of an included angle in c of FIG. 5 faces upward, represented by "∧"; a vertex of an included angle in d of FIG. 5 faces downward, represented by "∨".

Figure 6:
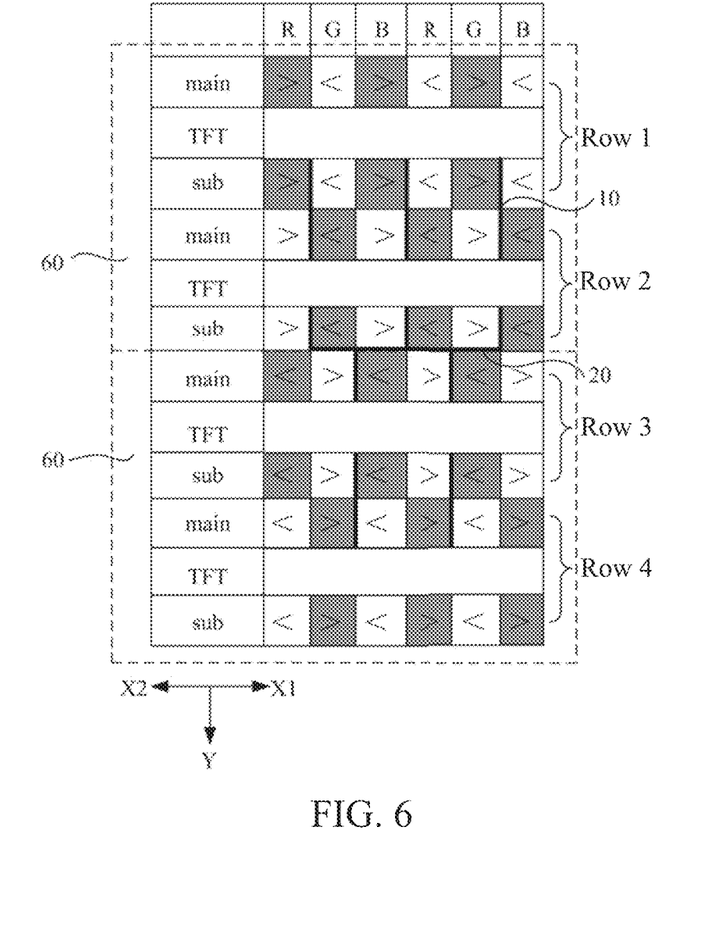
FIG. 6 is a schematic diagram of a first arrangement of each sub-pixel on the array substrate provided by an embodiment of the present application.

As shown in FIG. 6, it is a schematic diagram of a first structure of an array substrate provided by an embodiment of the present application. For convenience of description, take four rows of sub-pixels as an example. The array substrate comprises a plurality of pixels arranged in an array. Each of the pixels comprises a red sub-pixel R, a green sub-pixel G, and a blue sub-pixel B. Since the pixels are distributed in an array, the sub-pixels are also distributed in an array.

In the present embodiment, the first direction Y is perpendicular to a second direction X1. The first direction Y is a vertical direction, that is, the direction of columns in FIG. 6. The second direction X1 and a third direction X2 are horizontal directions, that is, the direction of rows in FIG. 6, wherein the second direction X1 is horizontal to the right, and the third direction X2 is horizontal to the left. The center main portion 100 is parallel to the second direction X2, that is, the center main portion 100 is along the horizontal direction. The edge main portion 200 is perpendicular to the center main portion 100, that is, the edge main portion 200 is along the vertical direction.

In addition, in FIG. 6, a "main" represents the main pixel area 11 of the sub-pixel, a "TFT" represents the transistor connection area 12 of the sub-pixel, and a "sub" represents the auxiliary pixel area 13 of the sub-pixel. Since the main pixel area 11, the transistor connection area 12, and the auxiliary pixel area 13 of each of the sub-pixels are arranged along the first direction Y, between the sub-pixels in adjacent rows, the auxiliary pixel area 13 of the sub-pixel in the previous row is adjacent to the main pixel area 11 of the sub-pixel in the following row. Further, in the sub-pixels in the same row, the main pixel areas 11 of adjacent sub-pixels are adjacent, and the auxiliary pixel areas 13 of the adjacent sub-pixels are also adjacent. In addition, in each of the sub-pixels, the transistor connection area 12 is provided between the main pixel area 11 and the auxiliary pixel area 13, and thus the main pixel area 11 and the auxiliary pixel area 13 of the same sub-pixel are not adjacent.

In the present embodiment, two adjacent included angles along the second direction X1 in the array substrate face opposite directions. That is, for each of the sub-pixels in the same row, the branch portions 300 of two adjacent sub-pixels in the main pixel area 11 face opposite directions, and the branch portions 300 of the two adjacent sub-pixels in the auxiliary pixel area 13 also face opposite directions. Therefore, in each row, the included angles of the sub-pixels in odd positions in the main pixel area 11 face the same direction, and the included angles of the sub-pixels in even positions in the main pixel area 11 also face the same direction. Further, the included angles of the sub-pixels in the odd positions in the main pixel area 11 and the included angles of the sub-pixels in the even positions in the main pixel area 11 face opposite directions. In each row, the included angles of the sub-pixels in odd positions in the auxiliary pixel area 13 face the same direction, and the included angles of the sub-pixels in even positions in the auxiliary pixel area 13 also face the same direction. Further, the included angles of the sub-pixels in the odd positions in the auxiliary pixel area 13 and the included angles of the sub-pixels in the even positions in the auxiliary pixel area 13 face opposite directions. Particularly, the orientation of the included angles located in the same row in the array substrate can only be in two ways, i.e., "> < > < > < . . . " or "< > < > < > . . .".

In this arrangement, when vertices of two included angles of adjacent sub-pixels in the same row in the main pixel area 11 point to the same point, that is, when the edge main portions 200 of the two sub-pixels in the main pixel area 11 are close to each other, the "union jack sign" type structure is formed at this place. Thus, the dark stripes are converged to the place to form converging dark stripes 10. When vertices of two included angles of adjacent sub-pixels in the auxiliary pixel area 13 point to the same point, that is, when the edge main portions 200 of the two sub-pixels in the auxiliary pixel area 13 are close to each other, the "union jack sign" type structure is also be formed at the place. Thus, the dark stripes are also converged to the place to form the converging dark stripes 10. That is, the converging dark stripes 10 are only generated between two adjacent sub-pixels in the same row.

In the present embodiment, from a first row, every two rows of the sub-pixels form a balance unit 60. In each of the balance units 60, the sub-pixels comprise first sub-pixels that are located in even positions of an odd-numbered row and in odd positions of an even-numbered row and second sub-pixels that are located in odd positions of the odd-numbered row and in even positions of the even-numbered row. In the first sub-pixels, a number of the included angles facing the second direction X1 is equal to that of the included angles facing the third direction X2, and the second direction X1 is opposite to the third direction X2. Each of the balance units 60 comprises two rows of the sub-pixels. From the first row, the sub-pixels in the first row and the sub-pixels in the second row form a first balance unit 60, the sub-pixels in the third row and the sub-pixels in the fourth row form a second balance unit 60, the sub-pixels in the fifth row and the sub-pixels in the sixth row form a third balance unit 60, and so on, until the sub-pixels in the penultimate row and the sub-pixels in the last row form a last balance unit 60.

During the one dot on/off special image test, the first sub-pixels are turned on, and the second sub-pixels are turned off; or the second sub-pixels are turned on, and the first sub-pixels are turned off. In FIG. 6, take the first sub-pixels being turned on and the second sub-pixels being turned off as an example for description. The sub-pixels in the first row and the sub-pixels in the second row form one balance unit 60, and the sub-pixels in the third row and the sub-pixels in the fourth row form another one balance unit 60. Since included angles are formed in the main pixel areas 11 and the auxiliary pixel areas 13 of each of the sub-pixels, in the first sub-pixels of the balance unit 60, the number of the included angles is four rows, the number of the included angles facing the second direction X1 is two rows, and the number of the included angles facing the third direction X2 is also two rows.

In each of the balance units 60, in the first sub-pixels, the number of the included angles facing the second direction X1 is equal to that of the included angles facing the third direction X2, and there are various arrangements that satisfy the rule.

In an embodiment, in the balance unit 60, in each of the first sub-pixels, the included angles in the main pixel area 11 and the included angles in the auxiliary pixel area 13 face the same direction. As shown in FIG. 6, in the balance unit 60 composed of the sub-pixels in the first row and the second row, the sub-pixels in even positions in the first row and the sub-pixels in odd positions in the second row are the first sub-pixels. The included angles of the second, fourth, sixth, . . . sub-pixels in the first row in the main pixel area 11 and in the auxiliary pixel area 13 face the same direction, and are all "<"; the included angles of the first, third, fifth, . . . sub-pixels in the second row in the main pixel area 11 and in the auxiliary pixel area 13 face the same direction, and are all ">". At this time, in the balance unit 60 composed of the sub-pixels in the first row and the second row, two rows of the first sub-pixels together form four rows of the included angles. The included angles in the first row and the second row face the same direction, the included angles in the third row and the fourth row face the same direction, and the included angles in the first row and the third row face opposite directions.

Since each of the balance units 60 comprises two rows of the sub-pixels, in the balance unit 60, the sub-pixels in the odd-numbered rows are the sub-pixels in the first row, and the sub-pixels in the even-numbered rows are the sub-pixels in the second row. For the first sub-pixels in the odd-numbered rows and the first sub-pixels in the even-numbered rows in the balance unit 60, there are two ways of the orientation of the included angles. One is that the orientation of the included angles of the first sub-pixels in the odd-numbered rows is "<", and the orientation of the included angles of the first sub-pixels in the even-numbered rows is ">", that is, the arrangement in the balance unit 60 composed of the sub-pixels in the first row and the second row as shown in FIG. 6; another one is that the orientation of the included angles of the first sub-pixels in the odd-numbered rows is ">", and the orientation of the included angles of the first sub-pixels in the even-numbered rows is "<", that is, the arrangement in the balance unit 60 composed of the sub-pixels in the third row and the fourth row as shown in FIG. 6, both of which can be used.

In each of the balance units 60, the number of the first sub-pixels is equal to the number of the second sub-pixels, and the orientation of the included angles in each of the first sub-pixels is opposite to the orientation of the included angles in the second sub-pixel adjacent thereto. Thus, when the number of the included angles facing the second direction X1 is equal to that of the included angles facing the third direction X2 in the first sub-pixels, the number of the included angles facing the second direction X1 is also equal to that of the included angles facing the third direction X2 in the second sub-pixels. Finally, the number of the included angles facing the second direction X1 is also equal to that of the included angles facing the third direction X2 in the whole balance unit 60.

By this arrangement, when the entire screen is lit, between two rows of the sub-pixels inside the balance unit 60, the number of the included angles facing the second direction X1 is equal to that of the included angles facing the third direction X2. Thus, the interlace balance can be achieved, and the color shift problem during normal lighting can be improved. During the one dot on/off special image test, when only the first sub-pixels are turned on, the number of the included angles facing the second direction X1 is equal to that of the included angles facing the third direction X2 between the two rows of the first sub-pixels in the balance unit 60, and thus the interlace balance can be achieved, when only the second sub-pixels are turned on, the number of the included angles facing the second direction X1 is also equal to that of the included angles facing the third direction X2 between the two rows of the second sub-pixels in the balance unit 60, and thus the interlace balance can also be achieved, thereby improving the color shift problem during the special image test.

In addition, when a distance between the main pixel area 11 and the auxiliary pixel area 13 of the sub-pixels in adjacent rows, there is no edge main portion 200. If the tilt direction of the branch portions 300 of the auxiliary pixel area 13 in the upper sub-pixels is the same as that of the branch portions 300 of the main pixel area 11 in the lower sub-pixels, horizontal pull dark stripes occur due to the misalignment of the branch portions 300 of the two, wherein the pull dark stripes are not conducive to the improvement of the transmittance. As shown in FIG. 4, in the current technology, the pull dark stripes 20 are generated between the sub-pixels in any two adjacent rows. However, in the arrangement as shown in FIG. 6, the converging dark stripes 10 and the pull dark stripes 20 are generated between the balance units 60, and only the converging dark stripes 10 are generated inside each of the balance units 60, that is, the converging dark stripes 10 and the pull dark stripes 20 are generated in the area between the sub-pixels in the second row and the third row, and only the converging dark stripes 10 are generated between the sub-pixels in the first row and the second row and between the sub-pixels in the third row and the fourth row. Compared with the prior art, the number of the pull dark stripes 20 is reduced, thereby improving the transmittance.

In an embodiment, in the balance unit 60, in each of the first sub-pixels, the included angles in the main pixel area 11 and the included angles in the auxiliary pixel area 13 face opposite directions. At this time, two situations are included.

Figure 7:
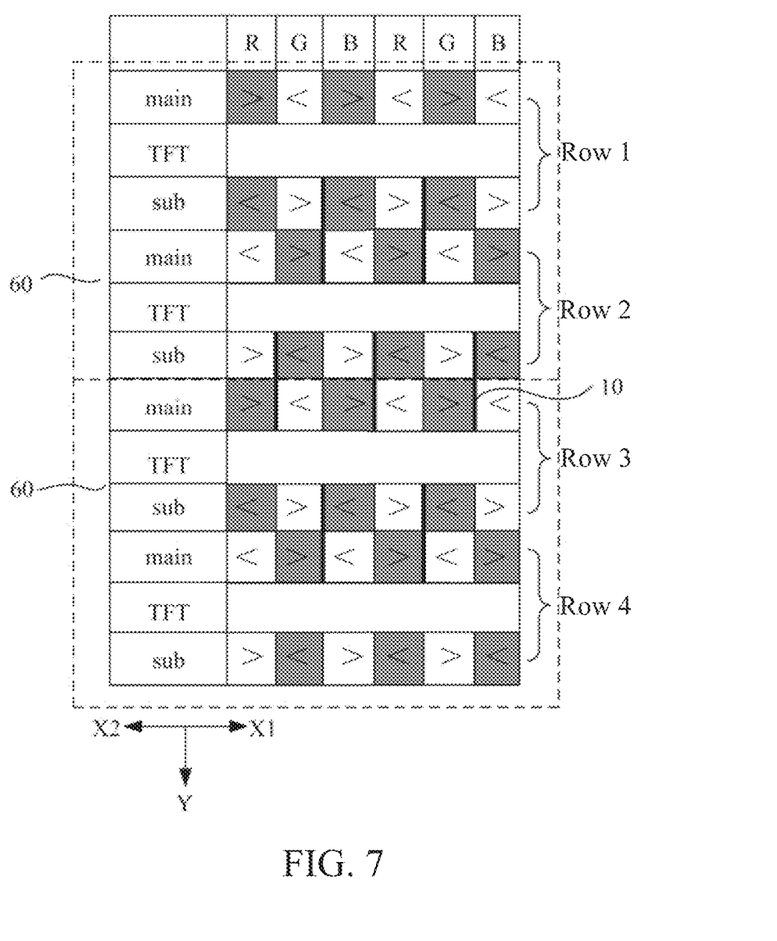
FIG. 7 is a schematic diagram of a second arrangement of each sub-pixel on the array substrate provided by an embodiment of the present application.

In an embodiment, in the balance unit 60, the included angles of all the first sub-pixels in the main pixel area 11 face the same direction. As shown in FIG. 7, in the balance unit 60 composed of the sub-pixels in the first row and the second row, the sub-pixels in even positions in the first row and the sub-pixels in odd positions in the second row are the first sub-pixels. The included angles of the second, fourth, sixth, . . . sub-pixels in the first row and of the first, third, fifth, . . . sub-pixels in the second row in the main pixel area 11 face the same direction, and are all "<". Further, the included angles in the auxiliary pixel area 13 also face the same direction, and are all ">". At this time, in the balance unit 60 composed of the sub-pixels in the first row and the second row, the two rows of the first sub-pixels together form four rows of the included angles. The included angles in the first row and the third row face the same direction, the included angles in the second row and the fourth row face the same direction, and the included angles in the first row and the second row face opposite directions.

In each of the balance units 60 in FIG. 7, the orientations of the included angles of the first sub-pixels in the odd-numbered rows and the first sub-pixels in the even-numbered rows in the main pixel area 11 are all "<", and the orientations of the included angles in the auxiliary pixel area 13 are all ">". However, the orientations of the included angles in the main pixel area 11 are all ">", and the orientations of the included angle in the auxiliary pixel area 13 are all "<", which is also applicable.

In each of the balance units 60, the number of the first sub-pixels is equal to the number of the second sub-pixels, and the orientation of the included angles in each of the first sub-pixels is opposite to the orientation of the included angles in the second sub-pixel adjacent thereto. Thus, when the number of the included angles facing the second direction X1 is equal to that of the included angles facing the third direction X2 in the first sub-pixels, the number of the included angles facing the second direction X1 is also equal to that of the included angles facing the third direction X2 in the second sub-pixels. Finally, the number of the included angles facing the second direction X1 is also equal to that of the included angles facing the third direction X2 in the whole balance unit 60.

By this arrangement, when the entire screen is lit, between two rows of the sub-pixels inside the balance unit 60, the number of the included angles facing the second direction X1 is equal to that of the included angles facing the third direction X2. Thus, the interlace balance can be achieved, and the color shift problem during normal lighting can be improved. During the one dot on/off special image test, only the first sub-pixels are turned on, or only the second sub-pixels are turned on. The included angles of each of the sub-pixels in the main pixel area 11 and the included angles of each of the sub-pixels in the auxiliary pixel area 13 face opposite directions inside the balance unit 60, and thus the balance inside the sub-pixels can be achieved, thereby improving the color shift problem during the special image test.

In addition, in the arrangement as shown in FIG. 7, the converging dark stripes 10 and the pull dark stripes 20 are generated inside each of the balance units 60, and only the converging dark stripes 10 are generated between the balance units 60. That is, the converging dark stripes 10 and the pull dark stripes 20 are generated between the sub-pixels in the first row and the second row and between the sub-pixels in the third row and the fourth row, and only the converging dark stripes 10 are generated in the area between the sub-pixels in the second row and the third row. Compared with the prior art, the number of the pull dark stripes 20 is reduced, thereby improving the transmittance.

In an embodiment, in the balance unit 60, the included angles of the first sub-pixels in different rows in the main pixel area 11 face opposite directions.

Figure 8:
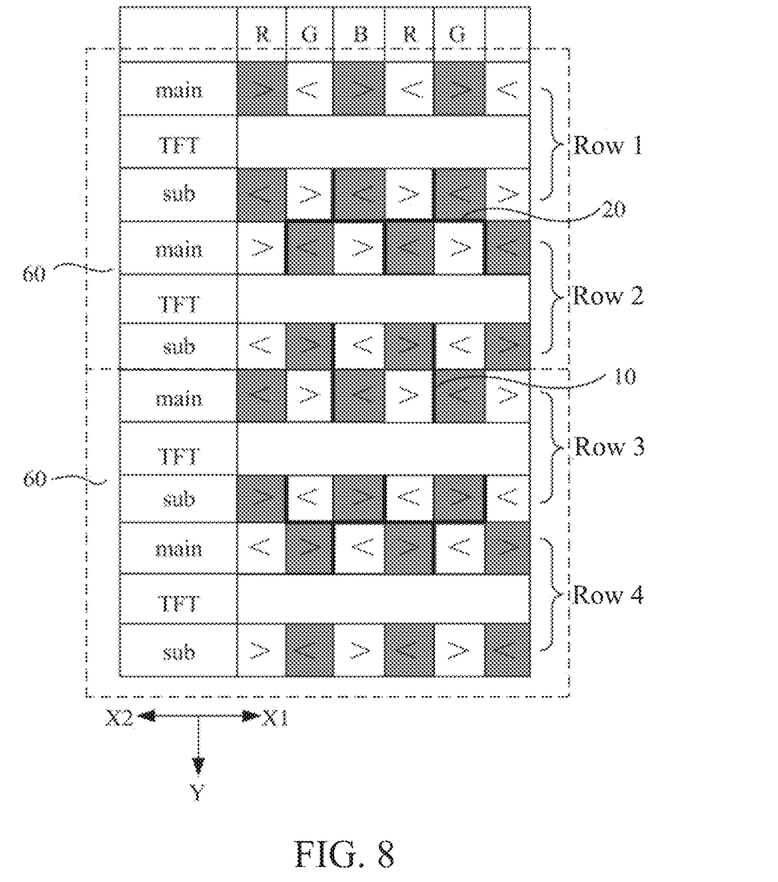
FIG. 8 is a schematic diagram of a third arrangement of each sub-pixel on the array substrate provided by an embodiment of the present application.

As shown in FIG. 8, in the balance unit 60 composed of the sub-pixels in the first row and the second row, the sub-pixels in even positions in the first row and the sub-pixels in odd positions in the second row are the first sub-pixels. The included angles of the second, fourth, sixth, . . . sub-pixels in the first row in the main pixel area 11 face the same direction, and are all "<". The included angles in the auxiliary pixel area 13 also face the same direction, and are all ">". Further, the included angles of the first, third, fifth, . . . sub-pixels in the second row in the main pixel area 11 face the same direction, and are all ">". The included angles in the auxiliary pixel area 13 also face the same direction, and are all "<". At this time, in the balance unit 60 composed of the sub-pixels in the first row and the second row, the two rows of the first sub-pixels together form four rows of the included angles. The included angles in the first row and the fourth row face the same direction, the included angles in the second row and the third row face the same direction, and the included angles in the first row and the second row face opposite directions.

In each of the balance units 60 in FIG. 8, the included angles of the first sub-pixels in different rows in the main pixel area 11 face opposite directions, and there are two ways. One is that the orientation of the included angles of the first sub-pixels in the odd-numbered row in the main pixel area 11 is "<", and the orientation of the included angles in the auxiliary pixel area 13 is ">"; the orientation of the included angles of the first sub-pixels in the even-numbered row in the main pixel area 11 is ">", and the orientation of the included angles in the auxiliary pixel area 13 is "<". That is, the arrangement in the balance unit 60 composed of the sub-pixels in the first row and the second row in FIG. 8. Another one is that the orientation of the included angles of the first sub-pixels in the odd-numbered row in the main pixel area 11 is ">", and the orientation of the included angles in the auxiliary pixel area 13 is "<"; the orientation of the included angles of the first sub-pixels in the even-numbered row in the main pixel area 11 is "<", and the orientation of the included angles in the auxiliary pixel area 13 is ">". That is, the arrangement in the balance unit 60 composed of the sub-pixels in the third row and the fourth row in FIG. 8. The two ways are applicable.

In each of the balance units 60, the number of the first sub-pixels is equal to the number of the second sub-pixels, and the orientation of the included angles in each of the first sub-pixels is opposite to the orientation of the included angles in the second sub-pixel adjacent thereto. Thus, when the number of the included angles facing the second direction X1 is equal to that of the included angles facing the third direction X2 in the first sub-pixels, the number of the included angles facing the second direction X1 is also equal to that of the included angles facing the third direction X2 in the second sub-pixels. Finally, the number of the included angles facing the second direction X1 is also equal to that of the included angles facing the third direction X2 in the whole balance unit 60.

By this arrangement, when the entire screen is lit, between two rows of the sub-pixels inside the balance unit 60, the number of the included angles facing the second direction X1 is equal to that of the included angles facing the third direction X2. Thus, the interlace balance can be achieved, and the color shift problem during normal lighting can be improved. During the one dot on/off special image test, only the first sub-pixels are turned on, or only the second sub-pixels are turned on. The included angles of each of the sub-pixels in the main pixel area 11 and the included angles of each of the sub-pixels in the auxiliary pixel area 13 face opposite directions inside the balance unit 60, and thus the balance inside the sub-pixels can be achieved, thereby improving the color shift problem during the special image test.

In addition, in the arrangement as shown in FIG. 8, the converging dark stripes 10 and the pull dark stripes 20 are generated inside each of the balance units 60, and only the converging dark stripes 10 are generated between the balance units 60. That is, the converging dark stripes 10 and the pull dark stripes 20 are generated between the sub-pixels in the first row and the second row and between the sub-pixels in the third row and the fourth row, and only the converging dark stripes 10 are generated in the area between the sub-pixels in the second row and the third row. Compared with the prior art, the number of the pull dark stripes 20 is reduced, thereby improving the transmittance.

In the embodiments from FIG. 6 to FIG. 8, there are six types of the arrangement of the orientation of each of the included angles in the balance unit 60.

In an embodiment, the arrangement of the included angles of all the balance units 60 in the array substrate is the same, and, that is, the balance units 60 having the same type are used in the whole array substrate. In this arrangement, the change of the whole panel is relatively small, and the operation is relatively simple and easy.

In an embodiment, the arrangement of the included angles of the balance units 60 in different positions in the array substrate are not completely the same, that is, the aforementioned six types of the arrangement can be combined in any way according to the needs, which can improve the color shift problem during the special image test and improve the transmittance.

Figure 9:
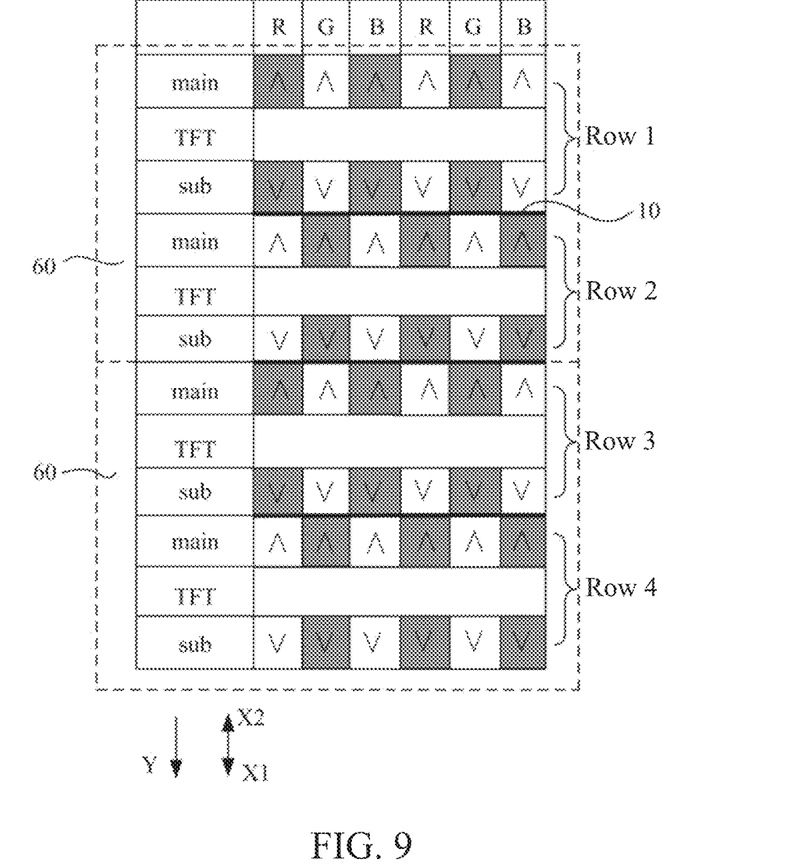
FIG. 9 is a schematic diagram of a fourth arrangement of each sub-pixel on the array substrate provided by an embodiment of the present application.

In an embodiment, the first direction Y is parallel to the second direction X1. As shown in FIG. 9, the first direction Y and the second direction X1 are both vertical directions, that is, the direction of the columns in FIG. 9, wherein the second direction X1 is vertically downward, and the third direction X2 is vertically upward. The center main portion 100 is parallel to the second direction X2, and, that is, the center main portion 100 is along the vertical direction. The edge main portion 200 is perpendicular to the center main portion 100, that is, the edge main portion 200 is along the horizontal direction. At this time, only the converging dark stripes 10 are generated between two adjacent sub-pixels in adjacent rows, and only the pull dark stripes 20 are generated between two adjacent sub-pixels in the same row.

In the present embodiment, the vertices of two adjacent included angles along the second direction X1 both face a boundary line of the sub-pixels in adjacent rows.

Since the main pixel area 11, the transistor connection area 12, and the auxiliary pixel area 13 of each of the sub-pixels are arranged along the first direction Y, between the sub-pixels in adjacent rows, the auxiliary pixel area 13 of the sub-pixels in the previous row is adjacent to the main pixel area 11 of the sub-pixels in the next row along the second direction X1. In addition, inside each of the sub-pixels, the transistor connection area 12 is provided between the main pixel area 11 and the auxiliary pixel area 13. Thus, the main pixel area 11 and the auxiliary pixel area 13 of the same sub-pixel are not adjacent.

In this arrangement, when it is desired to generate the converging dark stripes 10 between the sub-pixels in adjacent rows, it is necessary to make the vertices of the included angles of the upper sub-pixels in the auxiliary pixel area 13 and the vertices of the included angles of the lower sub-pixels in the main pixel area 11 between the sub-pixels in adjacent rows point to the same point. That is, the vertices of the two included angles both face a boundary line of the sub-pixels in adjacent rows. The "union jack sign" type structure is formed at this place. Thus, the dark stripes are converged to the place to form converging dark stripes 10. At this time, in the balance unit 60 composed of the sub-pixels in the first row and the second row, the orientations of the four rows of the included angles in the two rows of the sub-pixels are determined. That is, the orientation of the included angles of all the first sub-pixels in the main pixel area 11 is "/\", and the orientation of the included angles in the auxiliary pixel area 13 is "\/". In the meantime, the included angle in the same row always face the same direction, and the tilt directions of the branch portions between adjacent sub-pixels of the sub-pixels in the same row are always opposite. Thus, the pull dark stripes 20 are not generated. Compared with the prior art, the number of the pull dark stripes 20 is reduced, thereby improving the transmittance.

By this arrangement, when the whole screen is lit, between two rows of the sub-pixels inside the balance unit 60, the number of the included angles facing the second direction X1 is equal to that of the included angles facing the third direction X2. Thus, the interlace balance can be achieved, and the color shift problem during normal lighting can be improved. During the one dot on/off special image test, only the first sub-pixels are turned on, or only the second sub-pixels are turned on. The included angles of each of the sub-pixels in the main pixel area 11 and the included angles of each of the sub-pixels in the auxiliary pixel area 13 face opposite directions inside the balance unit 60, and thus the balance inside the sub-pixels can be achieved, thereby improving the color shift problem during the special image test.

The present application further provides a display panel comprising the array substrate provided by any of the above embodiments, and the display panel is a liquid crystal display panel.

According to the above embodiments, it can be seen as follows.

The present application provides an array substrate and a display panel. The array substrate comprises a plurality of sub-pixels arranged in an array. The sub-pixel comprises a main pixel area, a transistor connection area, and an auxiliary pixel area arranged along a first direction, and the sub-pixel is provided with a pixel electrode. In the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion. The branch portions on two sides of each of the center main portions are connected to form an included angle, and two adjacent included angles along the second direction in the array substrate face opposite directions. From a first row, every two rows of the sub-pixels form a balance unit. In each of the balance units, the sub-pixels comprise first sub-pixels that are located in even positions of an odd-numbered row and in odd positions of an even-numbered row. In the first sub-pixels, a number of the included angles facing the second direction is equal to that of the included angles facing a third direction, and the second direction is opposite to the third direction. In the present application, every two rows of the sub-pixels are used as a balance unit, and the included angles facing opposite directions in the first sub-pixels of the balance unit are configured in the same way. When only the first sub-pixels are lit or only the second sub-pixels are lit, the included angles facing opposite directions in each of the balance units can be balanced with each other, which improves the color shift problem during the special image test. Also, the design reduces the situation that the tilt directions are the same when the branch portions of the adjacent sub-pixels are close to each other directly, thereby reducing the number of the pull dark stripes and improving the transmittance. Therefore, the special image adaptation and the transmittance improvement are achieved at the same time.

In the foregoing embodiments, the description of the various embodiments has respective different emphases, and a part in some embodiment, which is not described in detail can be referred to the related description of other embodiments.

The detail description has been introduced above for the array substrate and the display panel provided by the embodiments of the present application. Herein, a specific case is applied in this article for explain the principles and specific embodiments of the present application have been set forth. The description of the above embodiments is only used to help understand the technical solutions of the present application and the core idea thereof. Those of ordinary skill in the art should understand that they can still modify the technical solutions described in the foregoing embodiments, or equivalently replace some of the technical features; and these modifications or substitutions do not make the nature of the corresponding technical solutions depart from the scope of the technical solutions of the embodiments of the present application.

What is claimed is:

1. An array substrate, comprising a plurality of sub-pixels arranged in an array, the sub-pixel comprising a main pixel area, a transistor connection area, and an auxiliary pixel area arranged along a first direction, and the sub-pixel being provided with a pixel electrode, wherein in each of the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion, the branch portions on two sides of each of the center main portions are connected to form an included angle, and two adjacent included angles along the second direction in the array substrate face opposite directions, wherein from a first row, every two rows of the sub-pixels form a balance unit; in each of the balance units, the sub-pixels comprise first sub-pixels that are located in even positions of an odd-numbered row and in odd positions of an even-numbered row and second sub-pixels that are located in odd positions of the odd-numbered row and in even positions of the even-numbered row; a number of the included angles facing the second direction in the first sub-pixels is equal to that of the included angles facing a third direction in the first sub-pixels, and the second direction is opposite to the third direction;

wherein the first direction is perpendicular to the second direction, and in the balance unit, the included angles of each of the first sub-pixels in the main pixel area and the included angles of each of the first sub-pixels in the auxiliary pixel area face the same direction.

2. The array substrate according to claim 1, wherein the included angles of all the balance units in the array substrate are configured in the same way.

3. The array substrate according to claim 1, wherein the included angles of the balance units in different positions in the array substrate are not completely configured in the same way.

4. A display panel, comprising an array substrate, the array substrate comprising a plurality of sub-pixels arranged in an array, the sub-pixel comprising a main pixel area, a transistor connection area, and an auxiliary pixel area arranged along a first direction, and the sub-pixel being provided with a pixel electrode, wherein in each of the main pixel area and the auxiliary pixel area, the pixel electrode comprises a center main portion parallel to a second direction, an edge main portion perpendicularly connected to the center main portion, and branch portions distributed on two sides of the center main portion and connected to the center main portion and the edge main portion, the branch portions on two sides of each of the center main portions are connected to form an included angle, and two adjacent included angles along the second direction in the array substrate face opposite directions, wherein from a first row, every two rows of the sub-pixels form a balance unit; in each of the balance units, the sub-pixels comprise first sub-pixels that are located in even positions of an odd-numbered row and in odd positions of an even-numbered row and second sub-pixels that are located in odd positions of the odd-numbered row and in even positions of the even-numbered row; a number of the included angles facing the second direction in the first sub-pixels is equal to that of the included angles facing a third direction in the first sub-pixels, and the second direction is opposite to the third direction;

wherein the first direction is perpendicular to the second direction, and in the balance unit, the included angles of each of the first sub-pixels in the main pixel area and the included angles of each of the first sub-pixels in the auxiliary pixel area face the same direction.

5. The display panel according to claim 4, wherein the included angles of all the balance units in the array substrate are configured in the same way.

6. The display panel according to claim 4, wherein the included angles of the balance units in different positions in the array substrate are not completely configured in the same way.

* * * * *